UNITED STATES PATENT OFFICE.

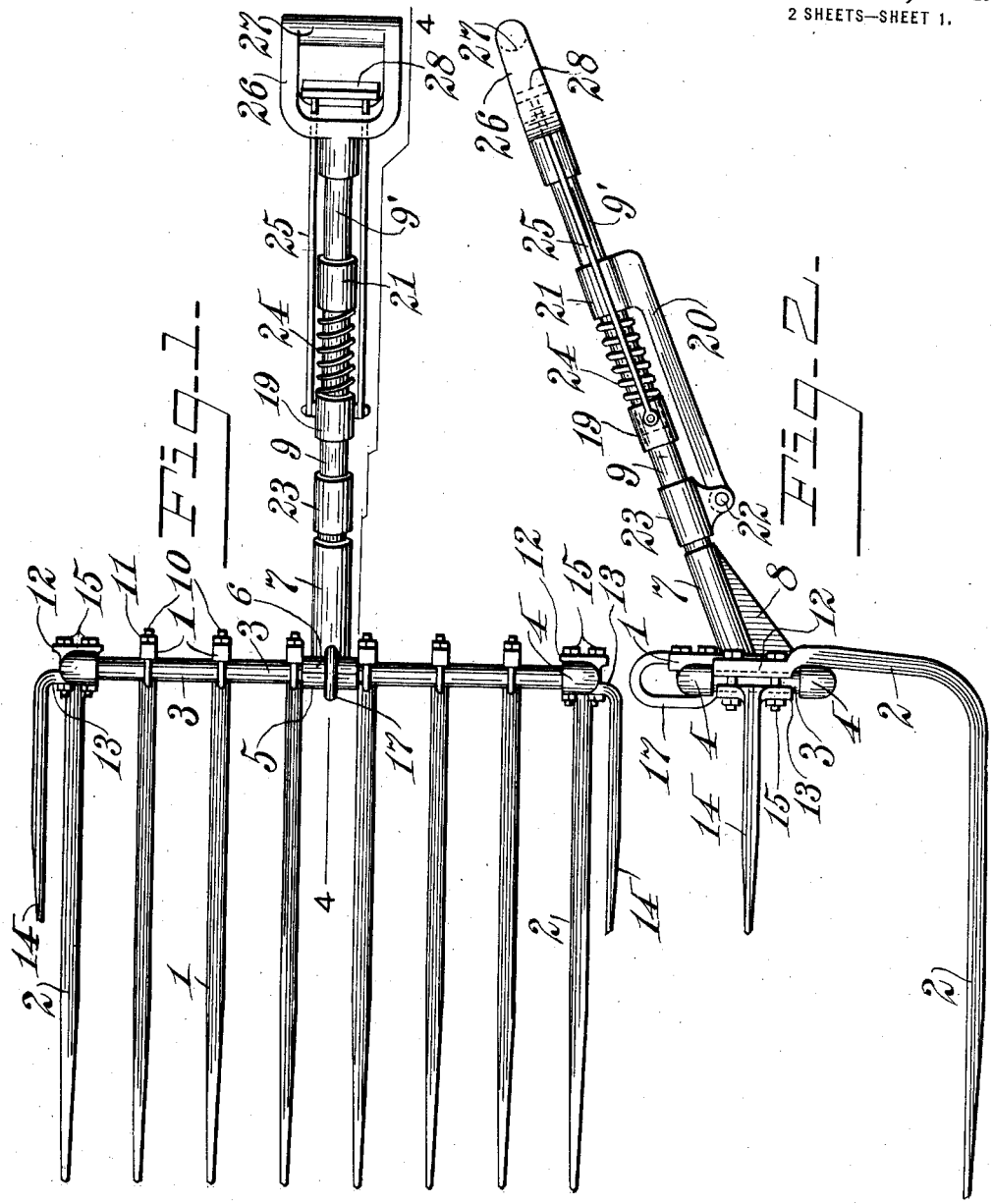

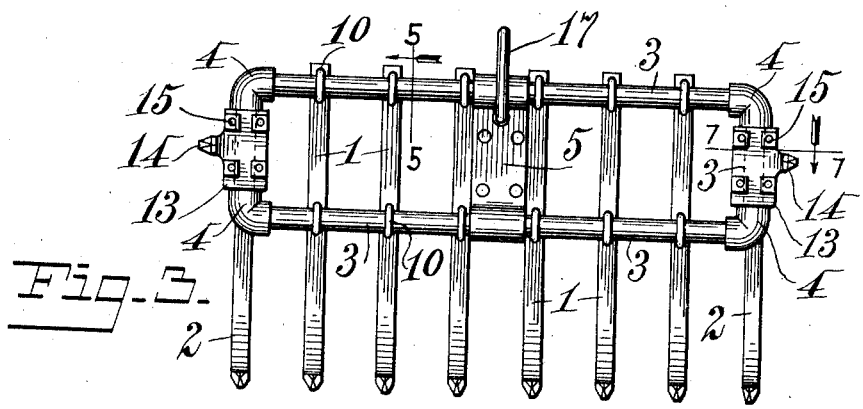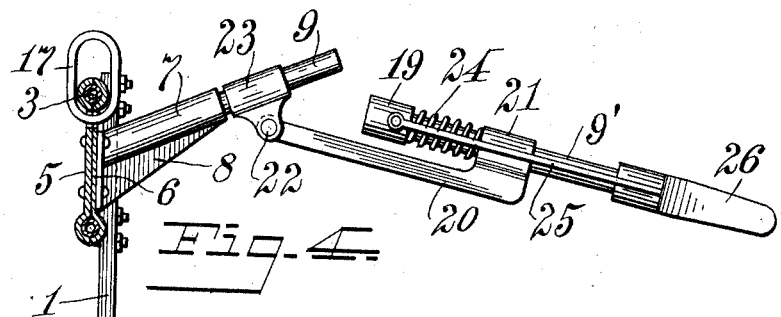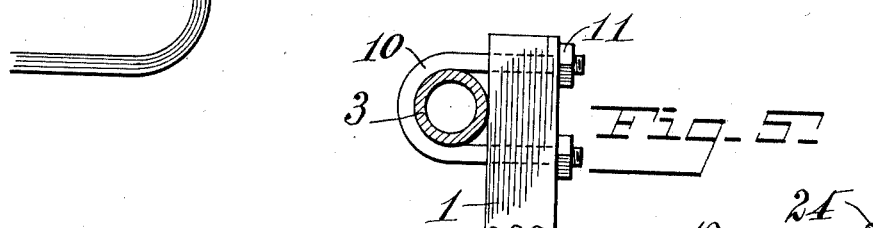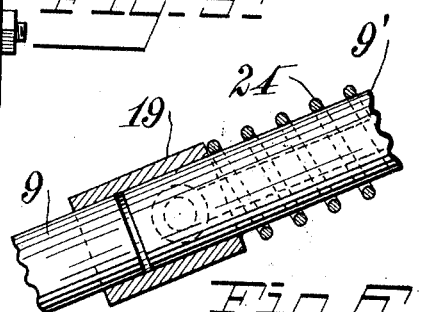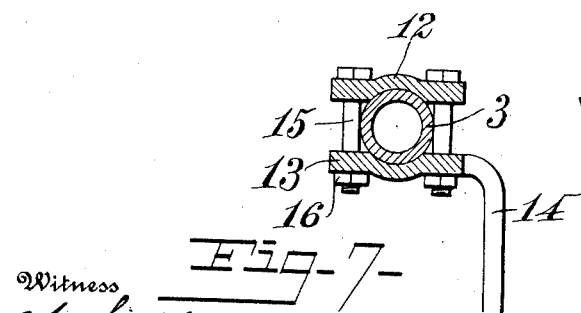

HARRY BITTLE, OF WEST ALEXANDRIA, OHIO, ASSIGNOR OF ONE-HALF TO IRA C. ALBERT, OF LEWISBURG, OHIO.

MANURE-LOADING FORK.

1,390,870.  Specification of Letters Patent.  Patented Sept. 13, 1921.

Application filed June 28, 1920. Serial No. 392,325.

*To all whom it may concern:*

Be it known that I, HARRY BITTLE, a citizen of the United States, residing at West Alexandria, in the county of Preble and State of Ohio, have invented certain new and useful Improvements in Manure-Loading Forks, of which the following is a specification.

This invention relates to new and useful improvements in manure loading forks.

The object of the invention is to provide a fork of this character which may be operated to penetrate and elevate the manure by power connections. A further object of the invention is to provide a fork of the above character which may be conveniently manipulated manually while in use, all as will hereinafter more fully appear from the following specification in connection with the accompanying drawings.

Referring to the accompanying drawings in general terms, Figure 1 is a top plan view of the manure loading fork. Fig. 2 is a side elevation thereof. Fig. 3 is a front elevation thereof. Fig. 4 is a section on the line 4—4 of Fig. 1 showing the handle of the fork disconnected at the joint. Fig. 5 is a section on the line 5—5 of Fig. 3. Fig. 6 is an enlarged detail sectional view of the handle connection, and Fig. 7 is a sectional view on the line 7—7 of Fig. 3.

In a more particular description of the invention similar reference characters denote corresponding parts in the drawings.

The fork is specially constructed or designed with a view to handling larger quantities of manure than can be conveniently handled manually. With this object in view the parts have sufficient strength to meet the strain placed upon them. The individual forks or tines —1— and the end tines —2— are arranged substantially in the same plane as shown in Fig. 2. And the upper side tines —14— are arranged at the sides substantially as shown in Fig. 2. The frame to which the forks are secured is of rectangular form as shown in Fig. 3 and consists of tubing —3— the ends of which are joined to form said frame by socket members —4—. The parallel frame members —3—3— are united at the middle portions thereof by socket plates —5— and —6— through the ends of which said frame members —3—3— pass. The plates —5— and —6— are secured in position as shown in Figs. 3 and 4 by rivets, preferably, and from the rearward plate —6— a socket member —7— extends which is strengthened by a web or flange —8— which extends down therefrom. The parts —6— —7— and —8— are integral and the socket member —7— rigidly supports a section —9— of the fork handle. The forks or tines —1— are united to the frame members —3—3— by individual U-bolts —10— which straddle said frame members and pass through openings in the upper ends of the tines, and the ends thereof projecting through said openings are tightened by means of nuts —11—. The two end forks —2—2— are united to the ends of the frame as are also the two side tines —14—14—. The upper ends of the tines —2—2— terminate in plates —12— which embrace the rear sides of the ends of the frame members —3—3—, and the side tines —14—14— are likewise extended in the form of plates —13— which embrace the front sides of the ends of the frame members —3—3—. These extended portions —12— and —13— of the end forks —2— and —14— lie between the ends of the socket members —4—4— and are clamped against the frame members —3—3— by bolts —15— which are tightened by nuts —16—. At the middle of the frame a loop —17— is placed and is connected with the frame by being loosely passed through an opening —18— in the plates —5— and —6—. This loop —17— provides for a suitable connection with a power hoist arrangement.

Such connection, while not shown in the drawings, may be in the form of a chain or other flexible means which may be lengthened or shortened in accordance with the manipulation of the fork. This power connection may be exerted either to elevate the fork with its load as well as to penetrate the manure. The application of power to the fork will be readily understood and requires no illustration beyond the part through which the power connection may be coupled, to wit, the loop —17—. The part —9— of the handle is detachably connectible to section —9'— of the handle by means of a socket member —19— which is slidably supported on the end of the handle portion —9'—. The handle portion —9'— is connected to the handle portion —9— by means of a connecting member —20— which is rigidly secured to said handle portion —9'— by having its end —21— made in the form of a socket through which said handle portion —9'— passes and is made fast thereto. The end of the member —20— is pivoted at —22— to a socket member —23— which is similarly formed and is rigidly connected with the handle portion —9—. It will therefore be seen that this connection forms a hinge between the two parts of the handle when the socket piece —19— is removed from the end of the handle portion —9—. As before stated, the socket piece —19— is slidably mounted on the end of the handle portion —9'—. Between said socket member —19— and the part —21— of the connection —20—, a coil spring —24— is placed which normally exerts a force on said socket member —19— to maintain the connection between the two members of the handle. Against the force of this spring the socket member —19— may be moved to disconnect the two parts of the handle as shown in Fig. 4. This movement is accomplished by means of rods —25— which extend from opposite sides of the socket member —19— through the sides —26— of the handle or gripe —27— which is attached to the extreme end of the part —9'— of the fork handle. The rod connections —25— are thus guided in the parts —26— of the hand gripe and the extreme ends of said rods are secured to a hand gripe —28— which lies within the hand gripe —27— in a position to be griped by the hand while the said hand gripes the hand gripe of the handle portion —9'—. Force may be thus exerted by the hand to withdraw the socket member —19— from the part —9— of the fork handle.

In the operation of the fork as thus described it is held and guided by the operator who at the same time controls the application of the power in the direction to which it is desired to move the fork. For example in moving the fork forward into a body of manure to be removed the power would be exerted to move the fork in such direction and thereafter to elevate the same with the load. As the fork is elevated above the wagon the joint of the handle may be broken to permit the fork to dump its load while at the same time the operator controls the manipulation of the fork in its removal from the dumping position on the wagon.

Having described my invention, I claim:

1. A manure fork comprising a rectangular open frame, a series of tines secured individually at two points to said frame, and end and side tines secured to the ends of said frame, said frame having supporting members united thereto from which extends a handle socket, a handle consisting of two parts one of which is supported in said socket, a socket member supporting the other part of said handle, said socket member being pivotally united to the first mentioned handle portion, and spring controlled means on the second mentioned handle portion for effecting a connection and disconnection thereof with the first named handle portion, and means for connecting a power connection with said fork.

2. A manure loading fork comprising a rectangular frame consisting of two members which are united at their ends by socket members, a series of tines individually connected to said frame members at two points, end and side tines united to the ends of said frame members, a socket member extended from said frame and connected to the two parts thereof, a handle portion mounted in said socket member, a detachable handle portion pivotally connected to the first named handle portion, spring controlled means slidably mounted on said detachable handle portion and adapted to connect and disconnect the two handle portions, and a hand gripe connected with said spring controlled means.

In testimony whereof I affix my signature.

HARRY BITTLE.